United States Patent
Burcar et al.

(10) Patent No.: US 10,974,853 B1
(45) Date of Patent: Apr. 13, 2021

(54) WHITE ROOM MODULAR SYSTEM FOR LAUNCH VEHICLES

(71) Applicant: UNITED LAUNCH ALLIANCE, L.L.C., Centennial, CO (US)

(72) Inventors: Mark Burcar, Littleton, CO (US); Michael S. Gerlach, Centennial, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 137 days.

(21) Appl. No.: 16/189,093

(22) Filed: Nov. 13, 2018

(51) Int. Cl.
  *B64G 5/00* (2006.01)
  *B64G 1/00* (2006.01)

(52) U.S. Cl.
  CPC .............. *B64G 5/00* (2013.01); *B64G 1/002* (2013.01)

(58) Field of Classification Search
  CPC .... B64G 5/00; B64G 2005/005; B64G 1/002; F41F 3/04
  See application file for complete search history.

(56) References Cited

U.S. PATENT DOCUMENTS

| | | | | |
|---|---|---|---|---|
| 2,968,410 | A | * | 1/1961 | Hamilton ................. E04H 12/34 414/783 |
| 3,625,306 | A | * | 12/1971 | Sauer ..................... B64F 1/315 182/69.4 |
| 4,932,607 | A | * | 6/1990 | Layton ..................... B64G 5/00 244/63 |
| 5,209,433 | A | * | 5/1993 | Alexander ............... B64G 5/00 182/12 |
| 5,217,188 | A | | 6/1993 | Thole et al. |
| 5,667,167 | A | | 9/1997 | Kistler |
| 6,186,039 | B1 | | 2/2001 | Mueller et al. |
| 6,360,994 | B2 | | 3/2002 | Hart et al. |
| 2016/0257435 | A1 | | 9/2016 | Coraboeuf et al. |

FOREIGN PATENT DOCUMENTS

| | | | |
|---|---|---|---|
| CN | 104142092 | 11/2014 | |
| RU | 2483990 C2 * | 6/2013 | ............... B64G 5/00 |
| RU | 172309 | 7/2017 | |
| WO | WO 99/017988 | 4/1999 | |

OTHER PUBLICATIONS www.universetoday.com, Universe Today Space and Astronomy News, Ken Kremer, "Stairway to Heaven!—Boeing Starliner Crew Access Arm's 'Awesome' Launch Pad Installation", Aug. 17, 2016 (Year: 2016).*
Spaceflightnow.com, Bridging the Past and the Future on the Shoulders of the Atlas Rocket, Justin Ray, Jan. 19, 2016 (Year: 2016).*
Delgado, "Transforming a Single-use Spaceport to Multi-use," National Aeronautics and Space Administration, SpaceOps Conference, 2012, 12 pages.

* cited by examiner

*Primary Examiner* — Benjamin P Lee
(74) *Attorney, Agent, or Firm* — Sheridan Ross P.C.

(57) ABSTRACT

A universal white room disposed at the distal end of an access arm of a launch pad service tower utilizes multiple interchangeable modular rooms of varying shapes, sizes and configurations to interface with access points on multiple differently configured launch vehicles and/or payload(s). The interchangeable modular rooms attach to a common portal in the white room allowing a single white room to be used. The modular rooms may be stationary relative to the white room or movable relative to the white room.

25 Claims, 13 Drawing Sheets

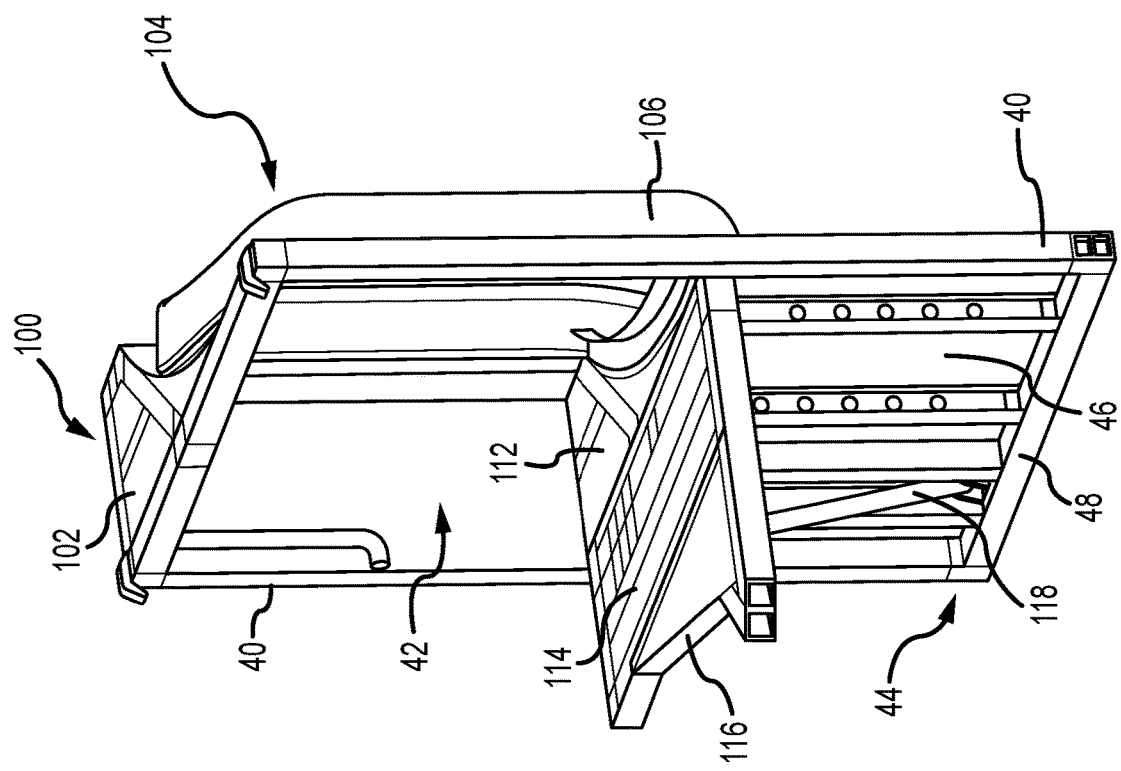
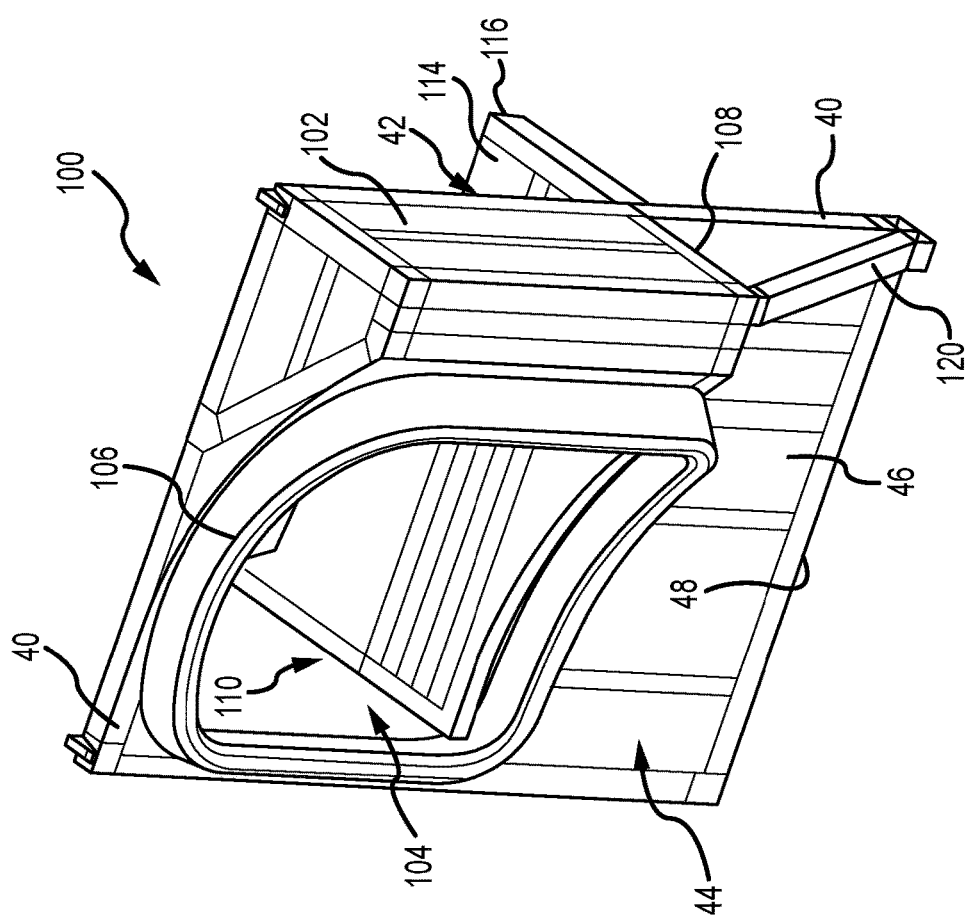

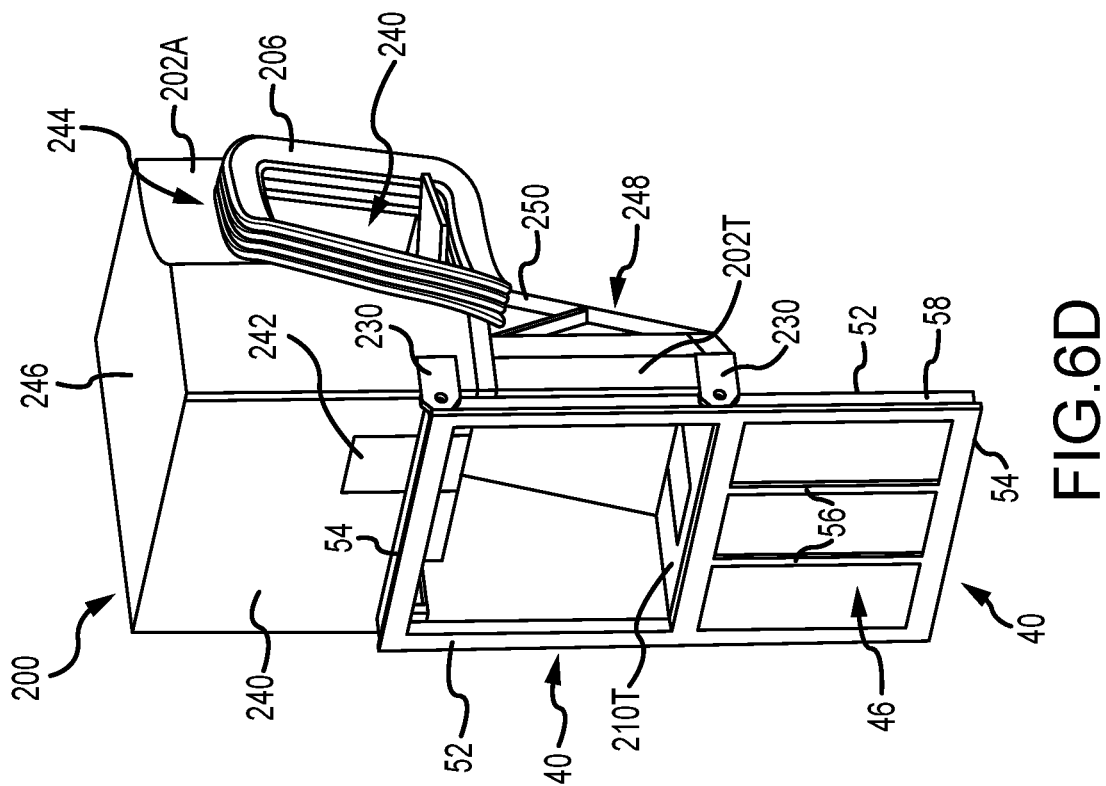
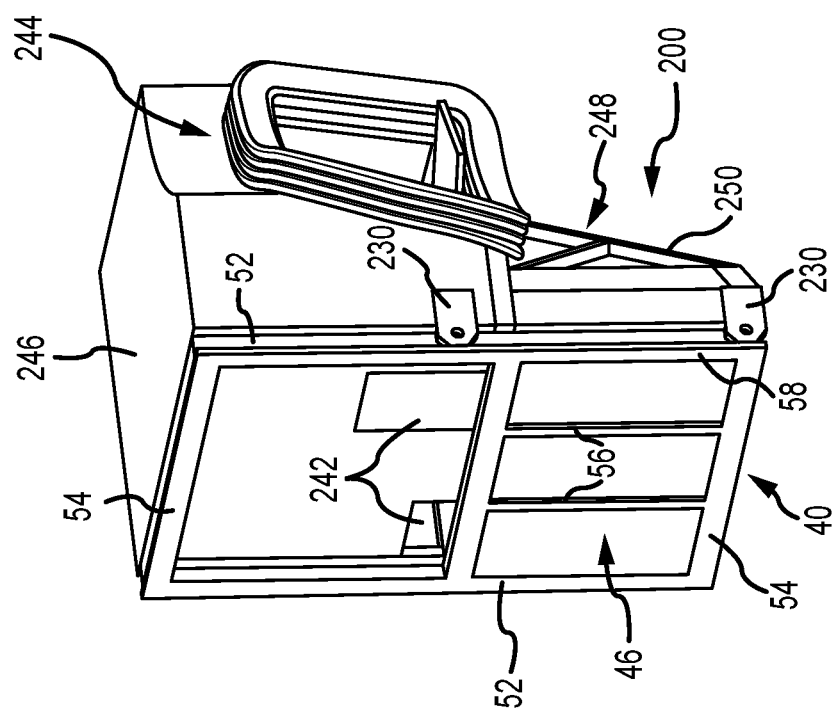

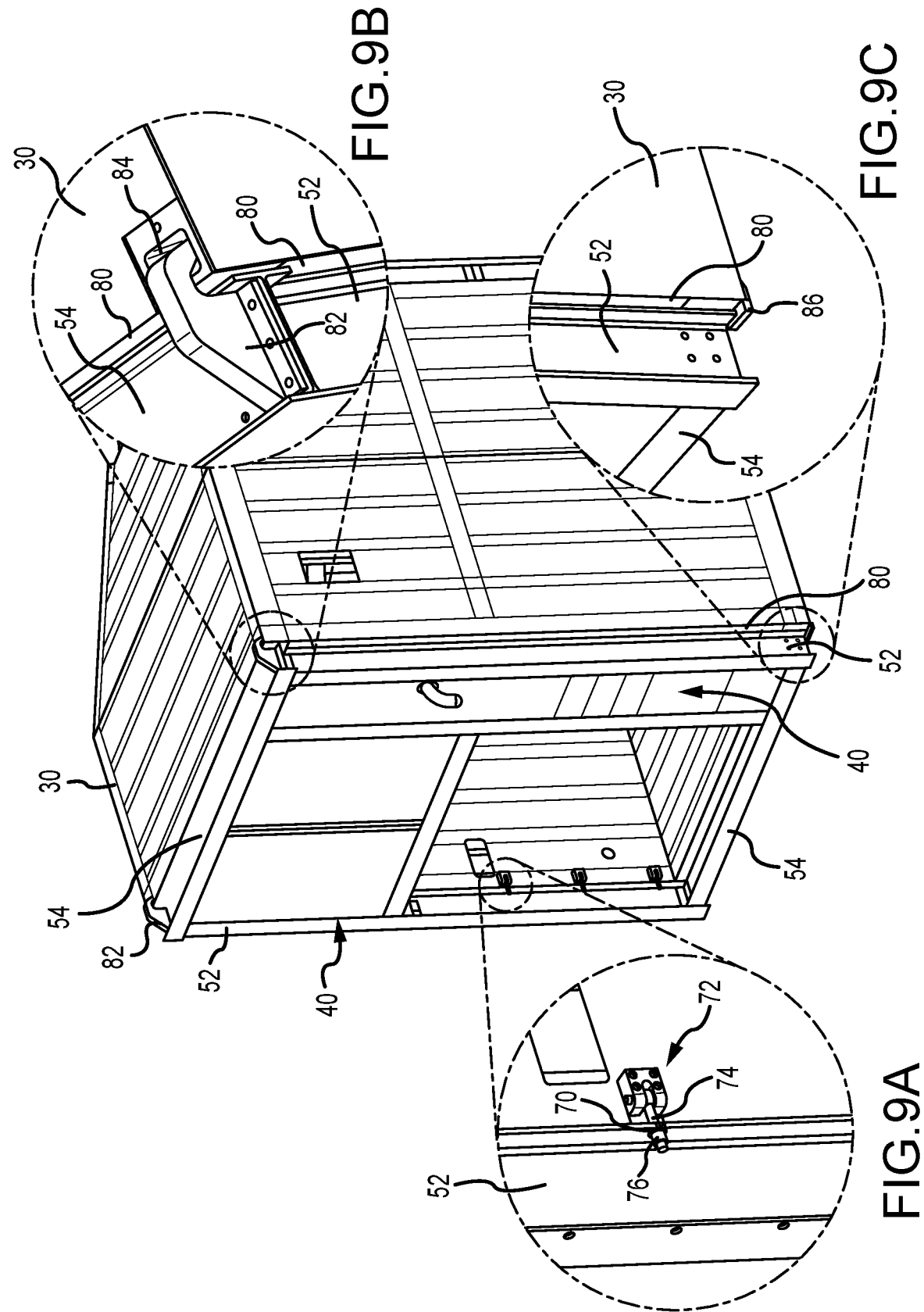

WHITE ROOM MODULAR SYSTEM FOR LAUNCH VEHICLES

FIELD OF THE INVENTION

This disclosure relates to interchangeable or modular rooms associated with launch vehicle service towers and, more specifically, modular rooms configured to interface with differently configured launch vehicles.

BACKGROUND OF THE INVENTION

Prior to launch, a launch vehicle and associated upper stage are positioned on a launch pad. A launch vehicle and upper stage may be positioned on the launch pad for several weeks prior to launch. The upper stage contains a payload that may include supplies for a space station, instrumentation and/or one or more spacecraft, for example, satellites. Typically, a vertical mast is positioned adjacent to the launch vehicle and assists in securing the launch vehicle in its vertical orientation. Umbilicals extending from the mast interconnect the ground-based systems and the launch vehicle-based systems, which disconnect upon liftoff of the launch vehicle. Because cryogenic propellant is typically used, propellant from remote sources is continuously loaded into propellant tanks to maintain pressures at appropriate levels. Launch vehicle electronic and avionics systems are also interconnected to ground systems while the launch vehicle is on the launch pad.

A service tower may also be located proximate to the launch vehicle and upper stage at the launch pad. In the case of a manned mission, the service tower facilitates crew access to the upper stage or spacecraft to be carried into space by the launch vehicle. In the case of manned or unmanned missions, the service tower also facilitates loading of and/or access to cargo or payloads carried on the upper stage. Sensitive electronic equipment within the launch vehicle and/or upper stage may need regular monitoring and attention. Certain payloads, for example, live organisms, may need to be added at the last moment prior to launch. The service tower typically moves away from the launch vehicle prior to lift off.

The service tower will have one or more access arms or catwalks that extend from the service tower to the launch vehicle and/or the upper stage. The access arms extend to and retract from the launch vehicle. A small enclosed room, known as a white room, may be located at the distal end of the access arm proximate the launch vehicle or upper stage while the launch vehicle is positioned on the launch pad. The white room provides a staging area for personnel accessing the launch vehicle and/or upper stage prior to launch. The room takes its name from the white paint first used in NASA's Project Gemini. In this room astronauts and attendants make final preparations before entering the upper stage spacecraft. Alternatively, from this room, scientists and/or technicians may access payload or cargo to perform maintenance, system checks, or to add, remove or swap out payload. In some instances, payload includes living organisms, such as mice, which can only be added shortly prior to liftoff.

As illustrated in FIG. 1, launch vehicles 10 and associated upper stages 12, come in a variety of shapes and sizes. Depicted are representations of an Antares, Athena II, Ariane V, Atlas II, Delta IV, Titan IV and Saturn V, respectively. The payload carried by these launch vehicles may be for a single mission having a single payload or may be multiple independent payloads each having a different purpose or mission. External booster rockets 14 may be added to a launch vehicle to provide added thrust to deliver heavier payloads. Also, because payloads can vary, the height and diameter of the upper stage may vary to accommodate different sized or multiple payloads. For example, compare the upper stage payload fairings 16 for the Titan and Atlas II. There may also be a need to access the launch vehicle, in addition to a payload. Accordingly, there may be more than one access point associated with the launch vehicle and payload, and each access point(s) may be at different distances and elevations relative to the service tower. For example, access points may be located on a vertical cylindrical surface or on a sloped conical surface, or the access points may be at different heights measured from the ground. For at least these reasons, an access arm extending from a service tower must be able to extend different distances from the service tower and the white room positioned at the end of the catwalk must interface with launch vehicles and/or upper stages of different shapes. Until now, a different white room was separately built for each different launch vehicle or launch vehicle configuration.

Current white rooms are designed to fit just one launch vehicle or launch vehicle configuration (for example, the space shuttle white room could only interface with the space shuttle). Extensive modification would be needed to a typical access arm or white room to allow the access arm to interface with one or more different launch vehicles or launch vehicle configurations that are launching from the same launch pad. Moreover, those modifications could take a long time to complete which could remove the launch pad from active launches and interfere with launch activities. A common white room design, in combination with interchangeable modules that interface with the end of the white room, allows a quick modification to allow an access arm to interface with many different launch vehicles or launch vehicle configurations that are launching from the same launch pad, without interfering with the launch cadence of the launch pad.

SUMMARY OF THE INVENTION

Several exemplary embodiments of systems, apparatus and methods for accessing the contents of a launch vehicle and associated payload(s) are disclosed herein. According to aspects of the disclosure, a universal or reusable white room is positioned at the distal end of an access arm connected to a service tower on a rocket launch pad. The universal white room provides personnel, including astronauts in connection with manned missions, with a protected working space adjacent to access points on a launch vehicle and/or payload(s). The access point(s) provide access to the interior of the launch vehicle, including, but not limited to, payload, instrumentation, systems and a crew cabin. Also disclosed are multiple embodiments of interchangeable modular rooms configured to attach to the white room. The modular rooms expand the useable volume of the white room and are configured to interface with differently configured launch vehicles and upper stages. As should be appreciated, launch vehicles and upper stages are constructed in different configurations. While most tend to be generally cylindrical in cross-section, some have larger diameters than others. Further, some upper stages have payload fairings that extend outwardly and have sloped exterior surfaces. Similarly, some manned crew cabins have sloped exterior surfaces. Access points may be located on a curved vertical surface or a sloped surface. In addition, access points may be located at one or more positions at varying heights relative to the ground, particularly given launch vehicles and upper stages are constructed in varying heights. Accordingly, the interchangeable modular rooms are designed to attach to a common or universal white room and adapt the universal white room to interface with access points associated with a plurality of disparately shaped launch vehicles and upper stages.

Each of the different modular rooms has common attach points or a common interface. The common interface joins each modular room to a common portal associated with the white room. The use of a common interface allows the plurality of modular rooms to be interchangeable and connect to a common portal associated with the white room.

Each of the different modular rooms has at least one portal to interface with at least one access point on a launch vehicle and/or payload(s). The location of the portal relative to the shape of the modular room will vary depending upon the configuration of the launch vehicle and/or payload(s) with which the modular room is designed to interface. Similarly, the shape and contour of the portal and a seal surrounding the portal will vary depending upon the configuration of the target launch vehicle and/or payload(s). The seal surrounding the portal should be flexible to provide a reasonably good interface with the surface of the launch vehicle and/or payload(s). For example, the seal may be made from a pliable material, such as rubber, like a seal on a car door, or may be inflatable like a billow. The portal and surrounding seal may be located on a wall of the modular room opposite the interface or on a wall adjoining the interface. The portal and surrounding seal could alternatively be located in the floor or ceiling of the modular room. The portal and surrounding seal may also be centrally located on a wall or offset to one side or oriented in a corner between adjoining walls.

The location of the portal and surrounding seal of the modular rooms can also be based upon the deployment motion of the access arm associated with the service tower. For example, if the access arm swings away from the service tower along a horizontal planar path, the portal and surrounding seal may be positioned on a corner or side wall of the modular room. Alternatively, if the access arm extends linearly, for example, in a telescoping motion, the portal and surrounding seal may be located on an end wall of the modular room opposite the interface. The access arm may also comprise two or more segments with an articulation joint positioned between two of the segments. Thus, the access arm could have a first pivot at the proximal end where the access arm joins the service tower and a second pivot at a location along the access arm between the proximal and distal ends. It is also within the scope of the present disclosure that an access arm vertically pivot at its proximal end orienting the access arm at an angle, i.e., vertically inclined or declined, to interface with an access point above or below the horizontal location of the proximal end of the access arm. Access arms may also be vertically repositionable along the height of the service tower, like an elevator, to provide greater flexibility and range of access to a single access arm.

According to aspects of the present disclosure, one or more of the modular rooms may also move vertically and/or horizontally after being mounted to the common white room. Such movement will allow the access portal and surrounding seal to move up, down or side to side relative to the location of the white room, providing increased range of motion and access to the launch vehicle and/or upper stage. Movement of the modular room also provides some flexibility when deploying the access arm to avoid preexisting structures that would otherwise block deployment of an access arm. For example, a mast may impede the motion of the access arm with a modular room attached but moving the modular room relative to the white room may eliminate the impediment.

According to aspects of the present disclosure, embodiments of the modular rooms also may have one or more compartments. For example, the modular room may have a transition compartment adjacent to the interface and the associated portal of the white room, and a second access compartment located outwardly and above, below, left or right of the transition compartment. This arrangement provides access to entrance points on a launch vehicle and/or upper stage that are not located in line with an access arm. To further increase range of motion, the multicompartment modular rooms may also move up, down and/or sideways relative to the white room.

According to aspects of the present disclosure, a system and method and apparatus for servicing a launch vehicle and/or an associated payload on a launch pad is disclosed having a service tower, at least one access arm having a proximal end connected to the service tower and a distal end, a white room or first compartment at the distal end of the access arm, the first compartment having at least a first portal and a second portal wherein the first portal provides ingress and egress between the access arm and the first compartment, and a modular room or second compartment removably attached to the first compartment at the second portal, the second compartment having a third portal for access to a launch vehicle and/or payload.

The system, method and apparatus may further include a third compartment or second modular room configured to removably attach to the first compartment at the first portal, the third compartment having a fourth portal, wherein the third compartment is configured differently compared to the second compartment.

The system, method and apparatus may also include a modular room or second compartment that is repositionable relative to the white room or first compartment.

The system, method and apparatus further includes various methods and apparatus for attaching the modular rooms to the white room, including different attachment mechanisms. Such attachment mechanisms include one or more hooks associated with the modular rooms that engage pockets associated with the white room to hang the modular room on the white room adjacent a portal of the white room. Alternatively, or in addition, a plurality of attachment mechanisms may be spaced about the portal of the white room and engage the interface associated with each of the modular rooms to secure the modular rooms to the white room. The system may also include a flange or ledge formed on the base of the white room proximate the portal access to the modular room to support the base of the interface of the modular rooms when a modular room is attached to the white room. It should also be appreciated that the attachment mechanisms may be reversed, with hooks on the modular rooms and pockets associated with the white room, and attachment mechanisms spaced about the perimeter of the modular room that engage complimentary mechanisms spaced about the portal of the white room.

According to aspects of the present disclosure, embodiments include a system, method and apparatus for servicing a launch vehicle and/or associated upper stage on a launch pad including a first compartment or white room positioned at the distal end of an access arm of a service tower, the first compartment having at least a first portal, a plurality of interchangeable modular compartments, each modular compartment having a first access portal and a second access portal, wherein the first access portal of each of the plurality of modular compartments interfaces with the at least first portal of the first compartment and each second access poral is configured to interface with a launch vehicle and/or upper stage.

The system, method and apparatus may also include an interface associated with each of the plurality of second compartments, the interface comprising a frame configured to attach to the first portal of the first compartment.

The system, method and apparatus may also include where at least one modular compartment is repositionable relative to the first compartment following attachment of the modular compartment to the first compartment.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 5A is a front perspective view of a first embodiment of modular room configured to attach to the white room of FIG. 4 further showing an access platform in a deployed position.

FIG. 5B is a rear perspective view of the embodiment of FIG. 5A, further showing the access platform in a deployed position.

FIG. 6B is a rear perspective view of the embodiment of the modular room of FIG. 6A.

FIG. 6D is a rear perspective view of the embodiment of the modular room of FIG. 6C.

FIG. 9A is an enlarged front perspective view of a first securement mechanism configured to attach a modular room to a white room.

FIG. 9B is an enlarged perspective view of a second embodiment of a securement mechanism configured to attach a modular room to a white room.

FIG. 9C is an enlarged perspective view of a third embodiment of a securement mechanism configured to attach a modular room to a white room.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
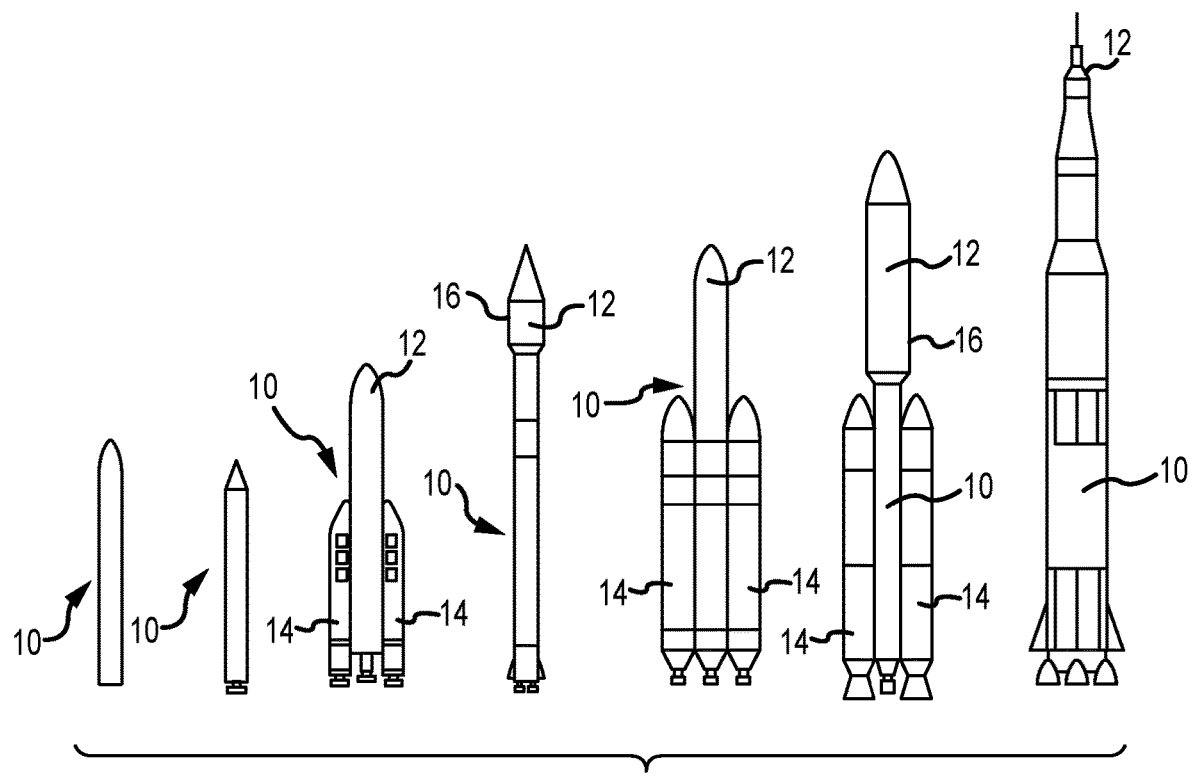
FIG. 1 is a front elevation view of a variety of known launch vehicles.
Figure 2:
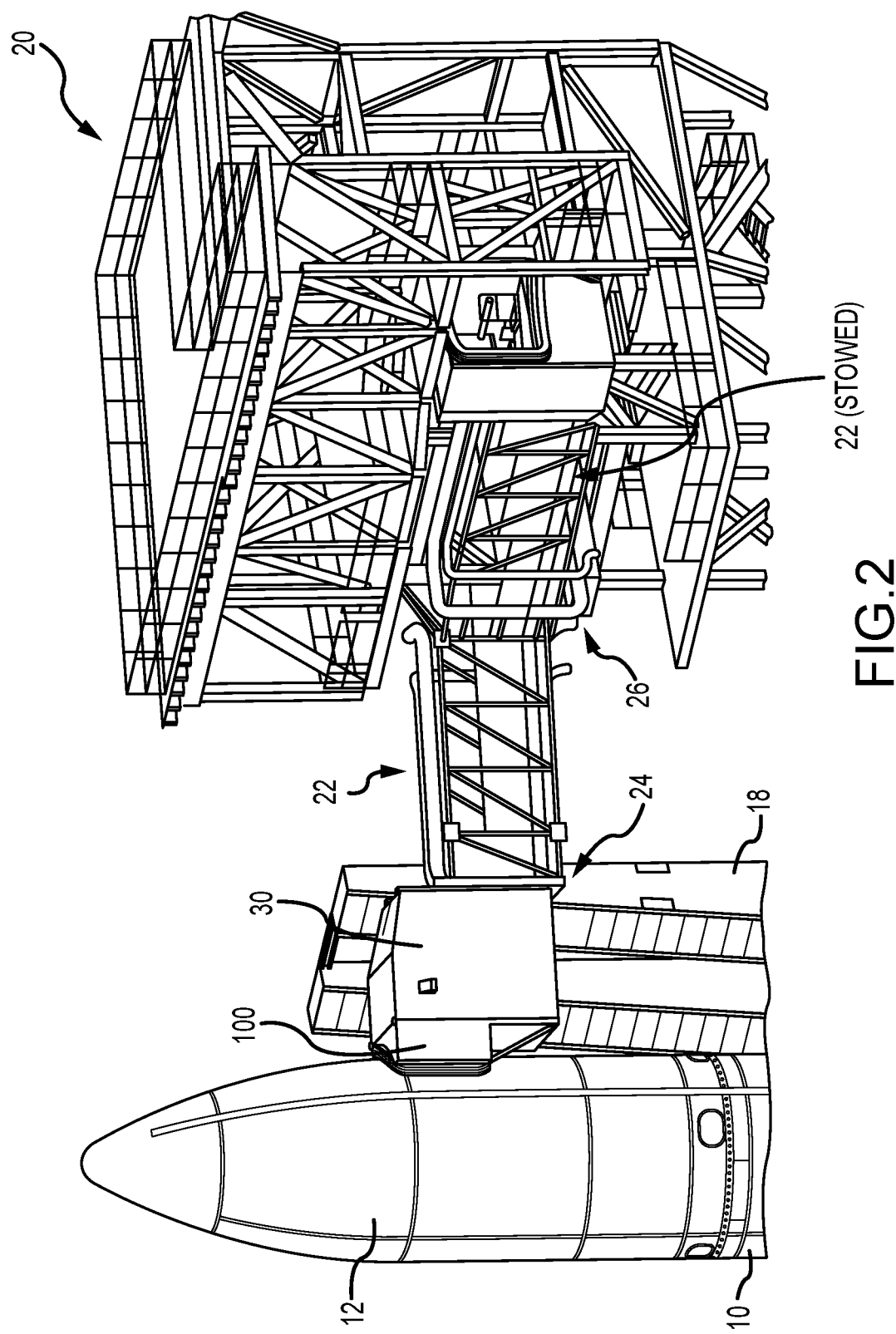
FIG. 2 is a perspective view of a launch vehicle and upper stage positioned on a launch pad and further showing a service tower.

FIG. 2 illustrates a launch vehicle 10 and payload 12 positioned on a launch pad, with a mast 18 located adjacent to the launch vehicle 10. A service tower 20 is also positioned proximate the launch vehicle 10. An access arm 22 extends from the service tower 20 and provides access to the launch vehicle 10. A universal white room 30 is positioned at the distal end 24 of the access arm 22. The white room 30 facilitates access to the payload 12 and/or launch vehicle 10 through access points in the launch vehicle. The white room 30 is enclosed to provide a level of privacy and to protect personnel as well as the interior of the launch vehicle and payload from environment. In this embodiment, the access arm 22 has a fixed length and pivots or rotates about an axis linking the proximal end 26 of the access arm 22 with the service tower 20. The access arm 22 is illustrated in both a stowed position adjacent the service tower 20 and a deployed position extending from the service tower 20 with the distal end 24 proximate an upper stage containing a payload 12.

Figure 3:
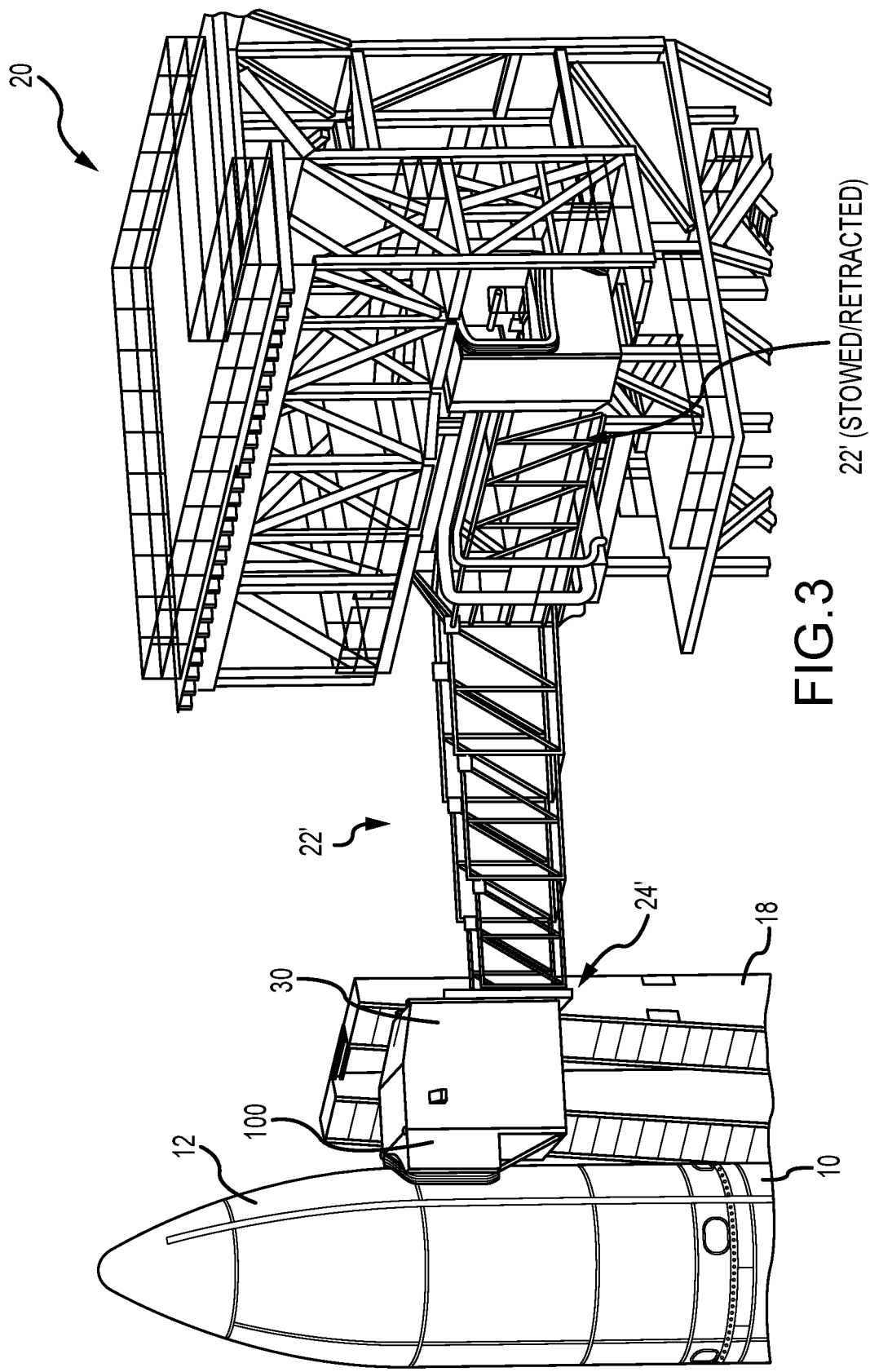
FIG. 3 is a is a perspective view of the launch vehicle and upper stage of FIG. 2 positioned on a launch pad and showing a different embodiment of a service tower.

FIG. 3 is identical to the embodiment of FIG. 2 with one notable exception. In FIG. 3, the access arm 22' pivots relative to the service tower 20 and telescopes in length. Here, the access arm 22' is shown both in an extended position proximate an upper stage 12 and in a retracted and stowed position adjacent the service tower 20. A white room 30 is positioned at the distal end 24' of the access arm 22'.

Figure 4:
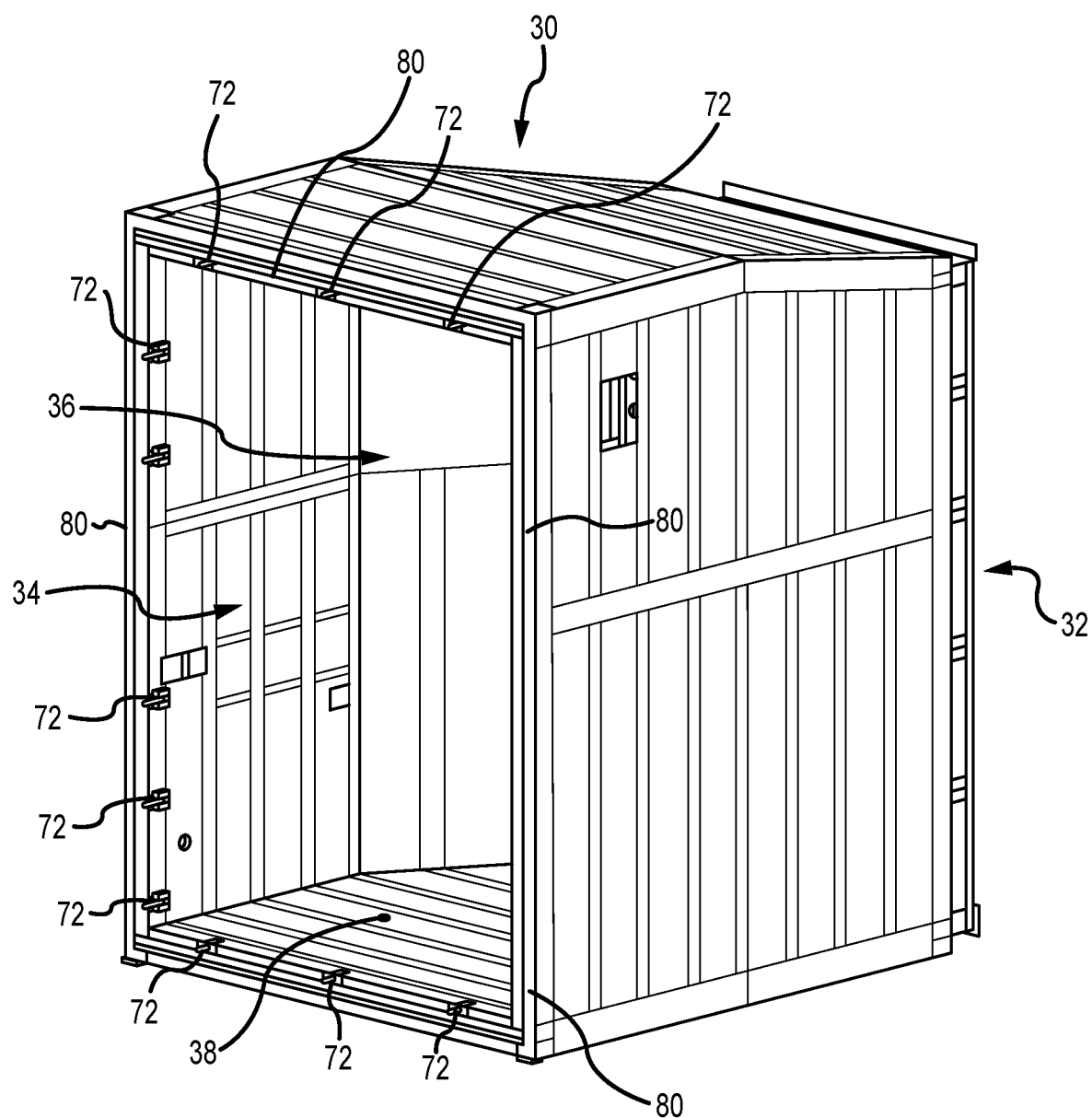
FIG. 4 is a perspective view of a universal white room.

FIG. 4 illustrates one embodiment of a universal white room 30. As illustrated in FIGS. 2 and 3, the white room 30 is configured to be positioned at the distal end of an access arm. The white room 30 has a first opening or portal 32 (not shown) through which personnel access the white room 30 from a walkway along an access arm 22. The white room 30 has a second portal 34 to which a plurality of modular rooms 100, 200, 300 may be attached. As illustrated, the first portal 32 and second portal 34 are at opposite ends of the white room 30. It should be appreciated that the first portal 32 and second portal 34 could be located on adjacent walls of the white room, or perhaps one or both portals could be located on the ceiling or floor of the white room. The white room 30 is configured to be universal and remain positioned at the end of the access arm 22. According to aspects of the present disclosure, a variety of modular rooms 100, 200, 300 are configured to attach to the white room 30 and interface with the second portal 34 of the white room 30 which modular rooms are configured to interface with differently shaped launch vehicles and/or upper stages.

It also should be appreciated that an access arm 22 may be formed from two or more segments where an articulated joint may interconnect adjacent segments such that one segment may pivot or rotate relative to another segment. Further still, multiple access arms may be associated with a single service tower 20 and configured to access simultaneously or at different times different access points on a launch vehicle and/or payload(s). It is also within the scope of the present disclosure that one or more access arms may be configured to move vertically relative to the service tower such that a single access arm may access different access point along the height of the launch vehicle and/or payload(s). It is further within the scope of the present disclosure that an access arm may articulate and can pivot vertically relative to the service tower such that the distal end of the access arm may be vertically above or below the proximal end of the access arm attached to the service tower.

FIGS. 5A-5D illustrate a first embodiment of a modular room 100 according to aspects of the present disclosure. This particular modular room 100 is also shown attached to a white room 30 in FIGS. 2 and 3. The modular room 100 includes an interface or environmental seal 40 configured to attach to and enclose the second portal 32 of the white room 30. The environmental seal 40 is seen more clearly in FIGS. 5B and 5D. An access compartment 102 is located at a top portion 42 of the environmental seal 40. The compartment 102 includes an access opening or portal 104 which includes a flexible or pliable seal 106 surrounding the access portal 104 and configured to surround an access point on a launch vehicle 10 and/or payload 12. Positioning the access arm 22 will press the seal 106 against the exterior surface of the launch vehicle and/or payload(s). Alternatively, the seal 106 may be inflatable, like a billow, to form a relatively tight fit with the surface of the launch vehicle and/or payload(s). As is illustrated, the seal 106 has a curvature configured generally to match that of the profile of a launch vehicle 10 proximate the access point. Here, the seal 106 is curved to mate with a generally vertical cylindrical shaped surface. The radius of curvature will match that of the launch vehicle. As also seen, the seal 106 is offset relative to the compartment 102. The offset may be in either lateral direction relative to the compartment 102. The offset configuration facilitates use of an access arm 22 that horizontally pivots or swings out from the service tower 20. It is also within the scope of the present disclosure that the portal 104 and seal 106 may be centrally located relative to the compartment 102. A centrally located portal 104 and seal 106 would be compatible with a telescoping access arm 22 or with an access arm that is articulated, e.g., an access arm with two or more segments interconnected by a pivotable joint. A bottom portion 44 of the environmental seal 40 includes a partial wall 46 extending from the base 108 of the compartment 102 to the bottom 48 the environmental seal 40 to complete the enclosure of the second portal 34 of the white room 30.

Figure 5D:
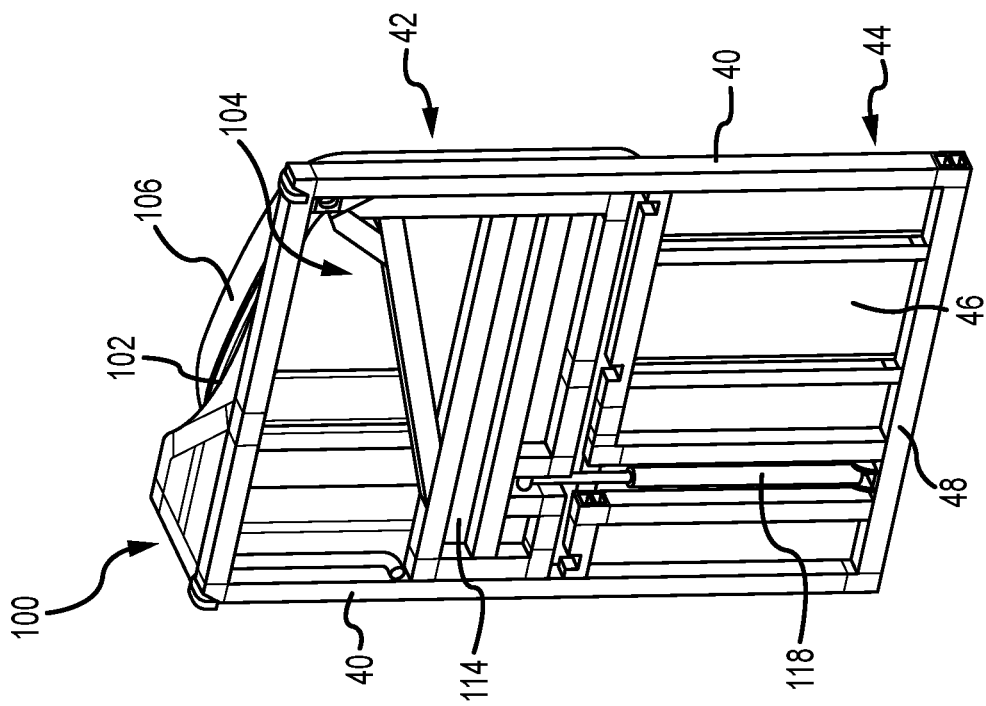
FIG. 5D is a rear perspective view of the embodiment of FIG. 5C, further showing the access platform in a stowed position.
Figure 5C:
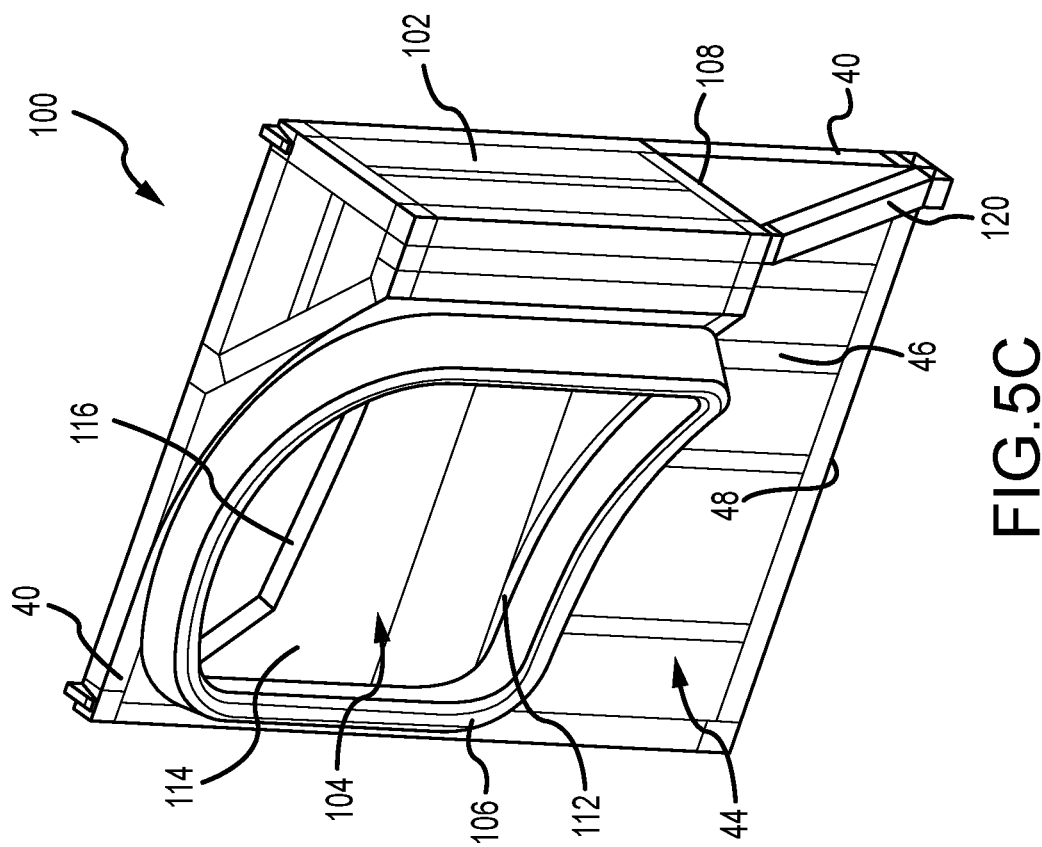
FIG. 5C is a front perspective view of the embodiment of FIG. 5A, further showing the access platform in a stowed position.

As further seen in FIGS. 5A and 5B, the compartment 102 includes a floor 110 which includes a permanent portion 112 and a folding or deployable portion 114. The deployable portion 114 extends into the interior 36 of the white room 30 and a set of stairs (not shown) attaches to the edge 116 of the deployable portion 114 such that personnel may move from the white room 30 to the access point on the launch vehicle or payload with efficiency. When access is not needed, the deployable portion 114 may be stowed in a folded position as is seen if FIGS. 5C and 5D. A pneumatic or hydraulic piston 118 may be used to deploy and stow the deployable portion 114 of the floor. Deployment may be accomplished by other methods known to those of ordinary skill in the art or manually. The stowed position shown in FIG. 5C also substantially closes the portal 104 in the compartment 102 for safety purposes, such as when the distal end of the access arm is not positioned adjacent the launch vehicle or payload. This would include when the access arm is stowed against the service tower or when the access arm 22 is being repositioned. A support leg 120 extends from the base of the environmental seal 48 to the underside 108 the compartment 102 to provide structural support to the compartment 102.

Figure 6C:
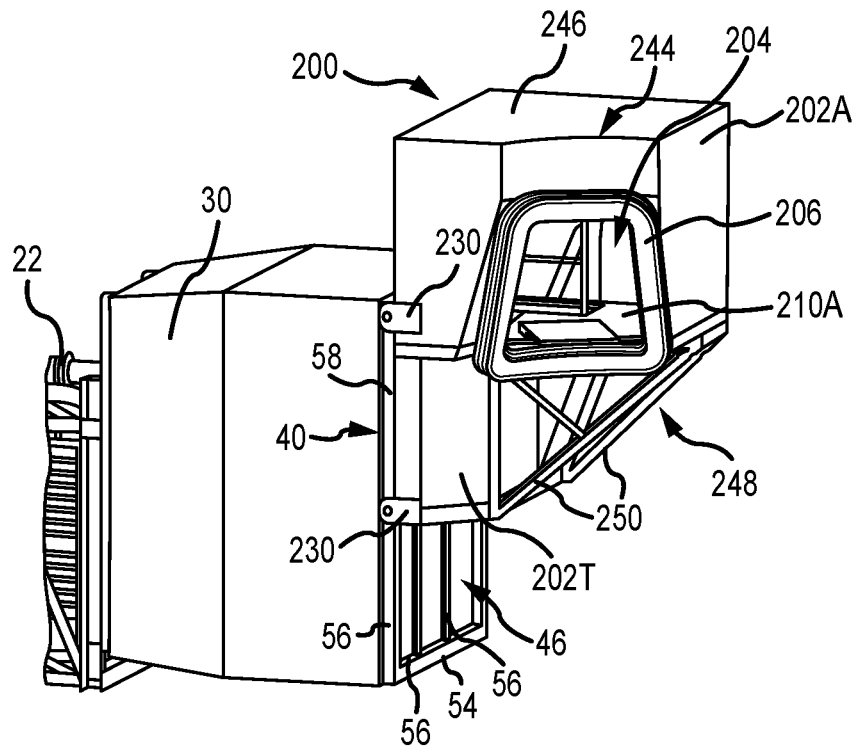
FIG. 6C is a front perspective view of the embodiment of the modular room of FIG. 6A, showing a portion of the modular room in a raised position.
Figure 6A:
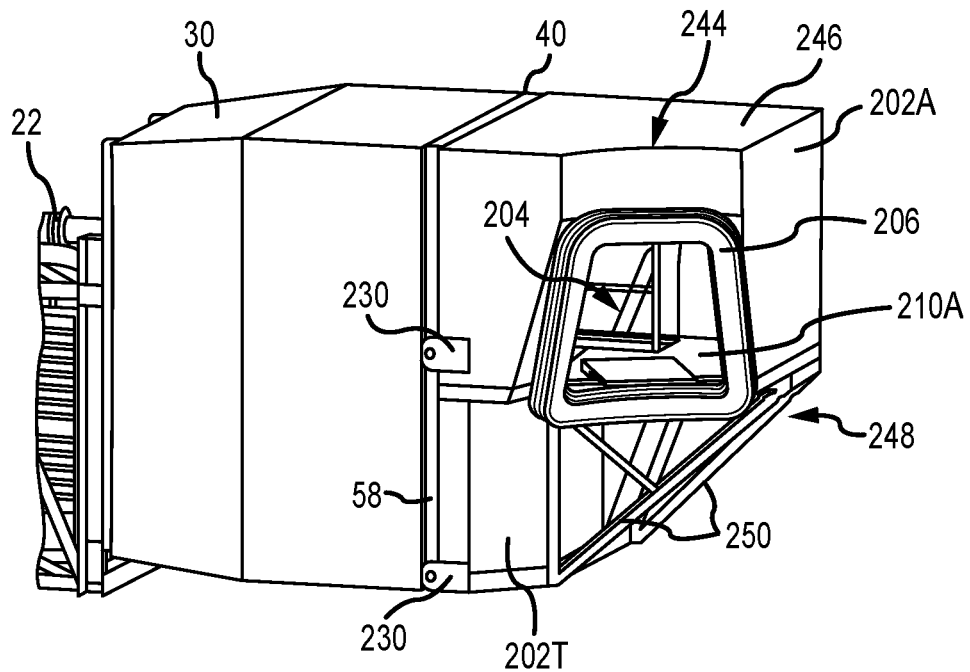
FIG. 6A is a front perspective view of the white room of FIG. 4 positioned at the distal end of an access arm, further showing a second embodiment of a modular room attached to the white room.

FIGS. 6A-D illustrate a second embodiment of a modular room 200 according to aspects of the present disclosure. In this embodiment, the interface or environmental seal 40 is configured similar to that of the first embodiment (FIGS. 5A-D). More particularly, an upper portion 42 is open and a lower portion 44 is closed by a partial wall 46. As with the embodiment of FIGS. 5A-D, the environmental seal 40 includes a perimeter metal frame 50 of two vertical members 52 and two horizontal members 54. Additional frame members 56 may be included to support the partial wall 46. Here, the modular room 200 includes an upper portion or access compartment 202A and a lower portion or transition compartment 202T. The modular room 200 also is configured to move vertically relative to the white room 30. FIGS. 6A and 6B show the modular room 200 in a first stowed or undeployed position. FIGS. 6C and 6D show the modular room 200 in a deployed position. The ability to reposition the modular room 200 vertically provides greater range and flexibility in accessing access points on a launch vehicle and/or payload(s). It should be appreciated that the modular room 200 could also be configured to move vertically downwardly rather than upwardly. In this context, the transition compartment 202T would be the upper portion and the access compartment 202A would be the lower portion of the modular room 200. The environmental seal 40 would also be inverted with the opening oriented on the bottom portion 44. The modular room 200 as illustrated includes four roller assemblies 230, two positioned on each side, that interface in tracks 58 associated with the vertical frame members 52 of the environmental seal 40. Motors reposition the modular room 200 between the first undeployed position and the second deployed position.

As seen in FIGS. 6B and 6D, the access compartment 202A includes a back or rear wall 240. When the modular room 200 is in the undeployed or stowed position, the lower wall 46 of the environmental seal 40 and the rear wall 240 of the access compartment 202A block access to the modular room 200, thereby providing safety and security. Openings 242 may be provided in the rear wall 240 as appropriate for electrical cabling, ventilation conduit or other reasons.

As seen in FIGS. 6A and 6C, the access compartment 202T includes a floor 210A. As seen in FIG. 6D, the transition compartment 202T also includes a floor 210T. When the access compartment 202A is in the deployed position, stairs would interconnect the floor 38 of the white room 30 to the floor 210T of the transition compartment 202T and the floor 210T of the transition compartment 202T with the floor 210A of the access compartment 202A. In comparison to the embodiment of FIGS. 5A-D, the upper or access compartment 202A is volumetrically larger than the compartment 102 providing personnel with more space.

Figure 7A:
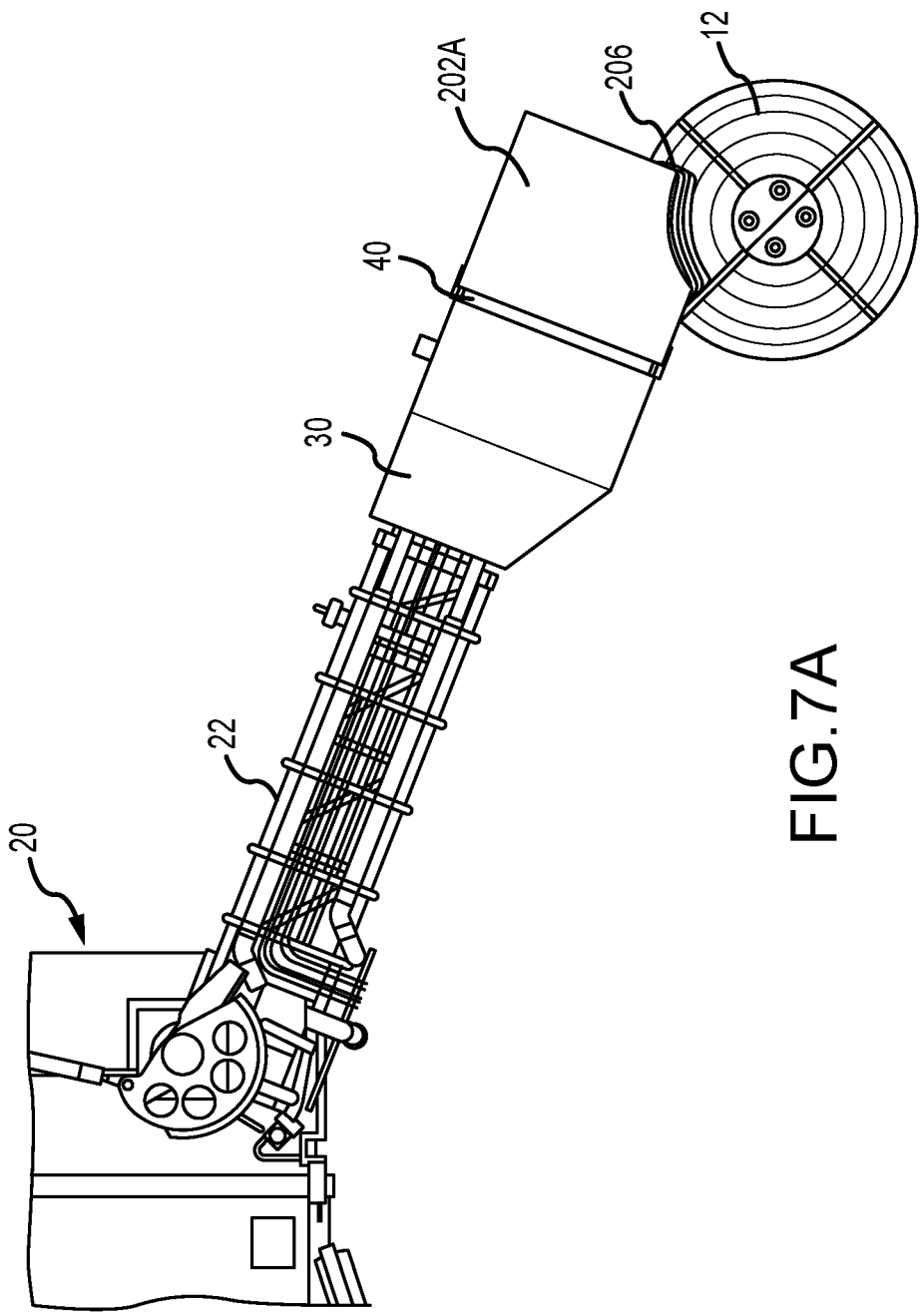
FIG. 7A is a top plan view of a launch vehicle on a launch pad, with the modular room of FIGS. 6A-D affixed to the end of an access arm extending from a service tower.
Figure 7B:
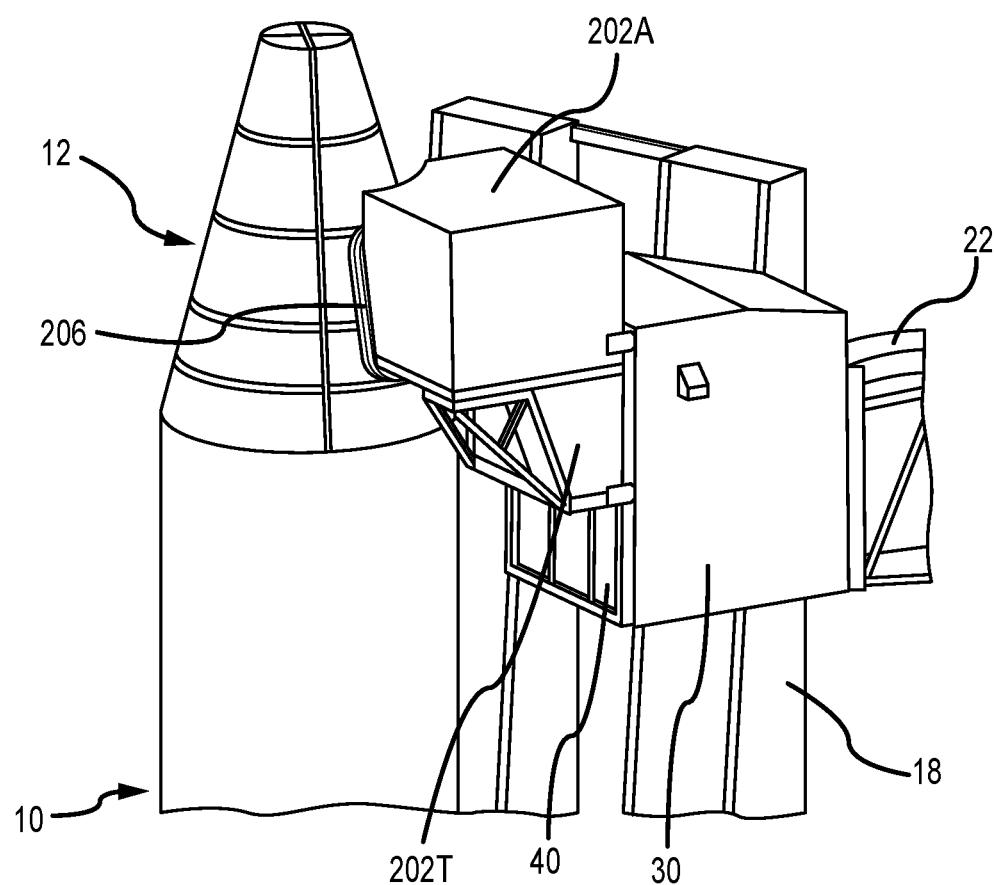
FIG. 7B is a front elevation view of FIG. 7A.

Also, the access compartment 202A includes a portal or opening 204 surrounded by a seal 206. The opening 204 is located at a corner 244 of the access compartment 202A opposite the interface or environmental seal 40. The opening 204 could be located solely on a wall opposite the environmental seal 40, solely on a wall adjacent to the environmental seal 40 or in the ceiling 246. The opening 204 and seal 206 are offset in a corner of the access compartment but could be centrally located on a single wall. The seal 206 is flexible to not cause damage to the spacecraft when in position for access. The seal may have an accordion-like construction or may be an inflatable billow. Here, the seal is oriented at an angle, as seen if FIGS. 6B and 6D. One purpose of an angled orientation is to interface with a sloped or angled surface, for example a conical surface of an upper stage or where the payload fairings 16 of an upper stage are oriented at an angle. This is illustrated in FIGS. 7A and B.

An undercarriage or support structure 248 extends between the transition compartment 202T and the access compartment 202A to support the load of the access compartment 202A. In this embodiment, the support structure 248 comprises a plurality of metal beams or trusses 250 as would be known to those of skill in the art.

Figure 8A:
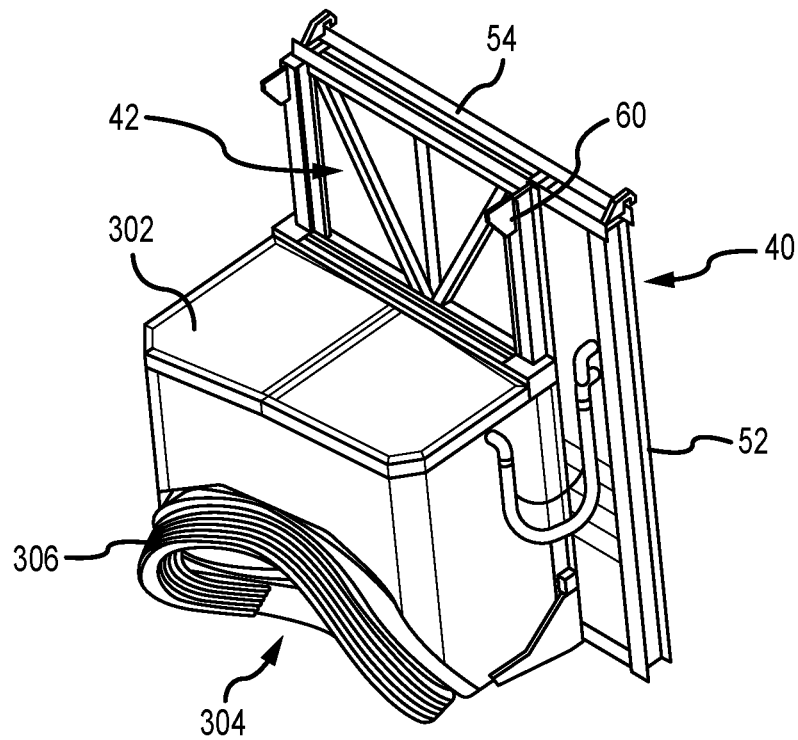
FIG. 8A is a front perspective view of a third embodiment of a modular room configured to attach to a white room.
Figure 8C:
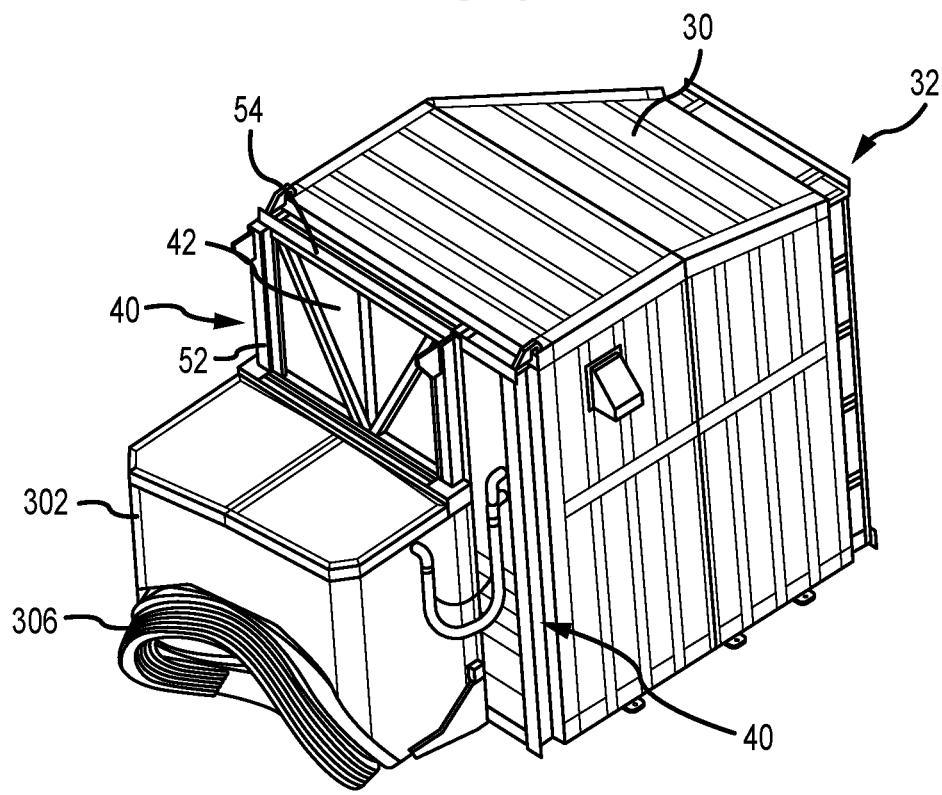
FIG. 8C is a front perspective view of the modular room of FIG. 8A, further showing the modular room attached to the white room of FIG. 4.
Figure 8B:
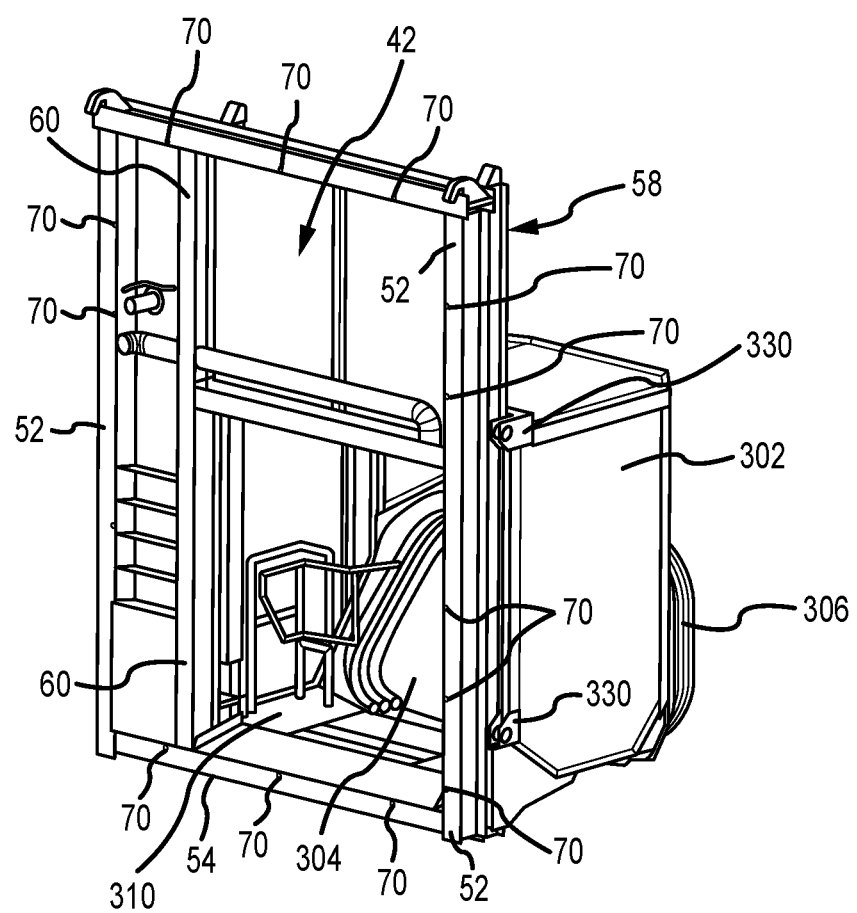
FIG. 8B is a rear perspective view of the embodiment of FIG. 8A.

A third embodiment of a modular room 300 is illustrated in FIGS. 8A-8C. Here, the modular room 300 comprises an access compartment 302 having a floor 310 and an opening or portal 304 surrounded by a flexible seal 306. The opening 304 and seal 306 are oriented centrally relative to the access compartment 302, on a wall opposite the environmental seal 40, as opposed to being offset as illustrated in the other embodiments. The opening 304 and seal 306 are also oriented at a downward angle for purposes of interfacing with a sloped surface. The opening 304 and seal 306 could be oriented vertically or at another different orientation as needed to interface with the configuration of the launch vehicle 10 and/or payload 12.

In this embodiment, the environmental seal 40 includes an opening in the bottom portion 44 that does not extend the entire lateral width of the environmental seal 40. The remainder of the environmental seal 40 comprises a wall portion 46 to enclose the second portal 34 of the white room 30. Thus, it should be appreciated that the access compartment of any modular room may encompass all or a portion of the area defined by the environmental seal.

As best seen in FIG. 8B, the access compartment 302 is designed to move vertically relative to the environmental seal 40 but not for purposes of accessing the spacecraft. Rather, the access compartment 302 is configured to move to avoid other structures on the launch pad as the access arm 22 is deployed. Thus, for example in the case of a swinging or pivoting access arm, the modular room 302 may pass close to a mast 18 or some other structure. Having the ability to reposition the modular room allows deployment of the access arm 22 with the modular room attached while providing flexibility to avoid other structures. The modular room may be movable in any direct—up, down, left and right. Similar to the embodiment of FIGS. 6A-6D, the modular compartment 302 includes roller assemblies 330 that travel in tracks 58 associated with the vertical frame members 52 and 60 associated with the frame 50 of the environmental seal 40.

One method of attaching a modular room to a white room is illustrated in FIGS. 8B and 9A-9C. Although illustrated with respect to the embodiment of FIGS. 8A-8C, the illustrated attachment mechanisms may be used in connection with attaching a white room with any modular room. As shown in FIG. 8B and 9A, the frame members 52, 54 of the environmental seal 40 include notches 70 which interface with corresponding attachment mechanisms 72 positioned around the periphery of the second portal 34 of the white room 30. The attachment mechanism 72 includes a bolt 74 that pivots 180 degrees between a retracted and an extended position where the bolt 74 is nested in a notch 70 formed in the frame members of the environmental seal 40. A nut 76 tightens on the bolt 74 and causes the frame members of the environmental seal 40 to press against a perimeter frame of the second portal 34 of the white room 30. When all of the attachment mechanisms 72 are secured, the environmental seal 40 is pulled uniformly and evenly against the frame 80 of the second portal 34.

As illustrated in FIG. 8B and 9B, hooks 82 are positioned at the top of the frame 54 of the environmental seal 40. Two hooks 82 are illustrated, but one or more could be utilized. The hooks 82 are received in corresponding pockets 84 formed along the top frame 80 of the second portal 34. Further support for the modular room is illustrated in FIG. 9C. Here, a support flange or shelf 86 extends outwardly from the frame 80 of the second portal 34 and provides a shelf upon which the frame 50 of the environmental seal 40 may rest. Typically, modular rooms would be positioned for attachment and detachment using a crane that would lift the modular room from a position on the ground (or on a delivery vehicle) to an attachment position. Initially placing the environmental seal 40 on the support flange 86 and engaging the hooks 82 in the pockets 84 allows support personnel on the access arm to then secure the attachment mechanisms 72. The flange 86 and pockets 84 support the weight of the modular room, the attachment mechanisms 72 further secure the modular room 100, 200, 300 to the white room 30. It should be appreciated that persons of skill in the art, following review of the present disclosure, will recognize that other attachment methods and structures may be utilized. Such other methods and structures are deemed to be within the scope of the present disclosure.

While various embodiments of the present invention have been described in detail, it is apparent that modifications and alterations of those embodiments will occur to those skilled in the art. For example, the seal surrounding the portal of a modular room may vary from the construction shown and include other types and/or configurations of seals that would be known to persons of ordinary skill in the art upon review of the present disclosure. In addition, the seals may vary in contour or configuration to match the contour or configuration of the launch vehicle or upper stage proximate the access points. The modular rooms may be repositionable relative to the white room as needed, whether for access purposes, positioning or both. Roller assemblies associated with vertical frame members and/or horizontal frame members of the environmental seal is one method of repositioning a modular room. Other methods and structures known to those of ordinary skill in the art upon review of this disclosure are deemed to be within the scope of the present disclosure. The three-dimensional shape or volumetric configuration of the modular rooms may also vary as is appropriate to interface with intended launch vehicles and/or payload(s). Similarly, the three-dimensional shape or volumetric configuration of the universal white room may vary. However, it is to be expressly understood that such modifications and alterations are within the scope and spirit of the present invention, as set forth in the following claims. Other modifications or uses for the present invention will also occur to those of skill in the art after reading the present disclosure. Such modifications or uses are deemed to be within the scope of the present invention.

What is claimed is:

1. A system of servicing a launch vehicle and/or an associated payload on a launch pad, comprising:
   a. providing a service tower;
   b. providing at least one access arm having a proximal end connected to the service tower and a distal end;
   c. providing a first compartment at the distal end of the access arm, the first compartment having at least a first portal and a second portal wherein the first portal provides ingress and egress between the access arm and the first compartment;
   d. providing a second compartment removably attached to the first compartment at the second portal, the second compartment having a third portal; and
   e. providing a third compartment configured to removably attach to the first compartment at the second portal, the third compartment having a fourth portal, wherein the third compartment is configured differently compared to the second compartment.

2. The system of claim 1, wherein the second compartment is repositionable relative to the first compartment.

3. The system of claim 2, wherein the second compartment moves horizontally and vertically relative to the first compartment.

4. The system of claim 1, further comprising a first seal surrounding the third portal of the second compartment and a second seal surrounding the fourth portal of the third compartment.

5. The system of claim 4, wherein at least one of the first seal and the second seal is configured to sealingly engage the outer surface of a launch vehicle.

6. The system of claim 4, wherein the second and third compartments have a distal surface relative to the first compartment and defining a vertical corner and wherein at least one of the third seal is positioned at the corner of the second compartment and the fourth seal is positioned at the corner of the third compartment.

7. The system of claim 4, wherein at least one of the third seal and the fourth seal is configured to sealingly engage the outer surface of an upper stage.

8. The system of claim 4, wherein at least one of the third seal and the fourth seal is configured to sealingly engage the outer surface of a crew cabin.

9. The system of claim 1, further comprising moving the at least one access arm between a first position proximate the service tower and a second position wherein second compartment is proximate a launch vehicle.

10. The system of claim 9, wherein the access arm extends linearly outwardly between a first length and a second length relative to the service tower.

11. The system of claim 1, further comprising attaching the second compartment to the first compartment by hanging the second compartment on the first compartment adjacent the first portal.

12. The system of claim 1, further comprising attaching the second compartment to the first compartment using a plurality of attachment mechanisms spaced about the second portal.

13. The system of claim 1, wherein the second compartment comprises an access compartment and a transition compartment, and wherein, when the second compartment is attached to the first compartment, the transition compartment interfaces with the second portal and the access compartment is spaced from the second portal and includes a third portal.

14. The system of claim 1, wherein the second compartment further comprises an interface which connects to the first compartment at the second portal and forms an environmental seal between the first and second compartments.

15. The system of claim 1, further comprising moving the at least one access arm between a first position proximate the service tower and a second position wherein second compartment is proximate an upper stage.

16. The system of claim 1, further comprising moving the at least one access arm between a first position proximate the service tower and a second position wherein second compartment is proximate a crew cabin.

17. The system of claim 1, further comprising a plurality of hooks associated with at least one of the second and third compartments and a plurality of slots associated with the first compartment, and wherein the hooks mate with the slots to hang the at least one of the second and third compartments on the first compartment.

18. A system for servicing a launch vehicle, an upper stage and associated payload or a crew cabin on a launch pad, comprising:
   a first compartment positioned at the distal end of an access arm of a service tower, the first compartment having at least a first portal; and
   a plurality of interchangeable modular compartments, each modular compartment having a first access portal and a second access portal, wherein the first access portal of each of the plurality of modular compartments interfaces with the at least first portal of the first compartment and each second access portal of the plurality of modular components is configured to interface with a launch vehicle, upper stage and/or a crew cabin.

19. The system of claim 18, further comprising an interface associated with each of the plurality of modular compartments, the interface comprising a frame configured to attach to the first portal of the first compartment.

20. The system of claim 19, wherein the first portal of the first compartment comprises a flange and a portion of the interface of at least one of the plurality of modular compartments rests on the flange when the modular compartment is attached to the first compartment.

21. The system of claim 19, wherein the interface comprises a plurality of hooks and the first compartment comprises a plurality of pockets, and wherein each hook mates with a pocket to attach the interface to the first compartment.

22. The system of claim 21, further comprising a plurality of attachment mechanisms spaced about the first portal of the first compartment and a plurality of slots spaced about the interface frame of the plurality of modular compartments, and wherein the attachment mechanisms engage the slots to secure the interface to the first portal of the first compartment.

23. The system of claim 18, wherein at least one modular compartment is repositionable relative to the first compartment following attachment of the at least one modular compartment to the first compartment.

24. The system of claim 23, wherein for at least one modular compartment the first portal of the modular compartment is smaller than the first portal of the first compartment and wherein the interface encloses the portion of the first portal of the first compartment that does not interface with the first portal of the modular compartment.

25. A system for servicing a launch vehicle, an upper stage and associated payload or a crew cabin on a launch pad, the launch pad having a service tower and an access arm extending form the service tower, comprising:
- a first compartment configured to be positioned at the distal end of the access arm of the service tower, the first compartment having at least a first portal; and
- a plurality of interchangeable modular compartments, each modular compartment having a first access portal and a second access portal, wherein the first access portal of each of the plurality of modular compartments interfaces with the at least first portal of the first compartment and each second access portal of the plurality of modular components is configured to interface with at least one of a launch vehicle, upper stage and crew cabin.

* * * * *